United States Patent Office 2,980,708
Patented Apr. 18, 1961

2,980,708

EPOXY NITRILE PROCESS

George B. Payne, Berkeley, Calif., assignor to Shell Oil Company, a corporation of Delaware No Drawing. Filed June 25, 1959, Ser. No. 822,717

6 Claims. (Cl. 260—348)

This invention relates to novel epoxy nitriles and to a process for preparing them from epoxyaldehyde derivatives. More specifically, it relates to a novel process for preparing epoxy nitriles from epoxy aldoximes and to epoxy nitriles which result from such preparation.

The novel epoxy nitriles of my invention may, because of their possession of reactive epoxy and cyano groups, be useful for a variety of purposes. Under appropriate conditions, either the epoxy ring or the cyano radical may be reacted with the functional groups of other compounds to produce new chemicals having either cyano or epoxy substituents, or both functional groups may be so reacted. In particular, the epoxy nitriles may be polymerized through their epoxy rings to yield a rubber-like polymer, or they may be copolymerized with other epoxy-containing substances, such as the glycidyl ethers of bis(hydroxyphenyl)alkanes to modify the properties possessed by the polyepoxides.

The preparation of epoxy nitriles from epoxyaldehydes has heretofore not been disclosed in the art. In general, epoxy nitriles wherein the cyano group has been attached to a secondary carbon atom have been prepared by reactions between alkali metal cyanides and alpha-chloroketones, e.g., the reaction between alpha-chloroethyl methyl ketone and potassium cyanide to produce 2,3-epoxy-2-cyanobutane. Another method involves the addition of hypochlorous acid to the double bond of the nitrile of the corresponding unsaturated acid, and subsequent reaction of the chloroxy nitrile with alkali. These methods have the disadvantage of working with such undesirable materials as cyanides and hypochlorous acid.

It is an object of this invention to provide a method for preparing epoxy nitriles from derivatives of epoxyaldehydes. Another object of the invention is the provision of a process for preparing epoxy nitriles from epoxy aldoximes. Provision of a process for preparation of highly reactive glycidonitrile from glycidaldehyde derivatives is another object, as is the provision of the novel compound glycidonitrile itself. Still another object of the invention is a route from epoxyaldehyde derivatives to epoxy nitriles employing such common and easily handled reagents as lower alkyl acidic compounds.

These objects are accomplished in the present invention by a process which comprises reacting epoxyalkyl aldoximes with lower alkyl acidic reagents to form oxime esters and pyrolyzing the resulting esters at a temperature below about 200° C. to produce the corresponding epoxyalkyl nitriles. The process can be best understood from the following description of the reagents and conditions employed.

The epoxyalkyl aldoximes that are the starting materials for the process are prepared from epoxyaldehydes by reaction of the aldehydes with hydroxylammonium salts. Such compounds are characterized by possession of both a vincinal epoxy ring

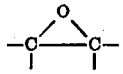

and an oxime radical >C=NOH. Examples of such aldoximes include 3,4-epoxybutanaldoxime, 2,3-epoxypentenaldoxime and 2,3-epoxy-2-methyl propanaldoxime; these compounds are selected from the preferred class of aldoximes having from 3 to 8 carbon atoms, and having an epoxy group on the terminal carbon atoms of the oxime. Of these, because of the considerable reactivity of the product nitrile, the most preferred oxime is glycidaldoxime, 2,3-epoxypropanaldoxime.

Also useful as starting materials in the process are epoxyalkyl aldoximes having non-terminal epoxy groups, including 2,3-epoxybutanaldoxime, 3,4-epoxyhexanaldoxime, 4,5-epoxyheptanaldoxime, and the like. Epoxy aldoximes having more than one epoxy group, such as 2,2,4,5-diepoxy pentanaldoxime and 3,4,6,7-diepoxyoctanaldoxime, are similarly useful reactants.

From these epoxyalkyl aldoximes are prepared oxime esters by reaction of the aldoxime with lower alkyl acidic reagents. By lower alkyl acidic reagents is meant those alkyl compounds having less than eight carbon atoms and which behave as acids in organic reactions. Such reagents are represented by the lower alkanoic acids, e.g., acetic acid, propionic acid, the butyric acids, valeric acid, and caproic acid, and the anhydrides of such acids, e.g., acetic anhydride, propionic anhydride, n-butyric anhydride, and the like. These lower alkyl acidic reagents are preferred because their oxime esters may be pyrolyzed readily and conveniently to yield the desired nitriles.

The reaction between the oxime and the acidic reagent is best conducted at temperatures below about 40° C., and preferably between about 20–35° C., to avoid polymeridation of the oxime. While reasonable yields of the oxime ester are produced when equimolar amounts of the reactants are employed, the reaction is faster and produces improved ester yields when a slight excess, on the order of 1.5 molar excess, of the acidic reagent is employed. Since the reactants are liquids at the recommended temperatures, solvents or diluents are not necessary, although such solvents as ether or dioxane may be employed if desired. The oxime ester-producing reaction is exothermic and cooling may be required to maintain it at the desired temperatures.

The product oxime ester may conveniently be separated from the reactants by distillation, preferably under reduced pressure. The ester so recovered is stable at low temperatures, and its structure may generally be described by the formula

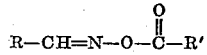

wherein R is the monovalent epoxyalkyl substituent of the epoxyalkanaldoxime and R' is the alkyl moiety of acidic reagent.

When the oxime ester is subjected to temperatures in excess of about 100° C., however, it pyrolyzes to yield the acid and the epoxyalkyl nitrile. While the pyrolysis reaction may be conducted in a variety of ways evident to those skilled in the art, the simplest and easiest mode of cracking the ester is merely to heat it, preferably under reduced pressure, at a temperature below about 200° C., to avoid destruction of the epoxy ring. Upon pyrolysis, the oxime ester cracks to yield the epoxy nitrile and an alkanoic acid corresponding to the starting acidic reagent.

While the process has been described as proceeding in a stepwise manner, it may easily be conducted continuously by reacting the oxime and acidic reagent together in a continuous or semi-continuous reactor, stripping the unreacted acid or anhydride from the reaction mixture for recycle, and continuously pyrolyzing the residual oxime ester while adding to the recycle stream the acid produced thereby. The product epoxy nitriles produced in this manner are stable colorless fluids with penetrating odors, which are readily recovered by condensation in suitable receivers.

Exemplary of the products obtained by this novel process is glycidonitrile produced from the oxime of glycidaldehyde. Because the molecule of glycidonitrile combines a cyano group attached to a secondary carbon atom and a terminal vic-epoxy group on the remainder of the molecule, this compound is particularly reactive and is highly useful in polymerization reactions, either with itself or with other epoxy compounds. Curing may be achieved with such common curing agents as amines, boron trifluoride and the like. Glycidonitrile may also be reacted with such aldehyde as formaldehyde, the latter yielding cyclic epoxy triazines.

The following examples will illustrate the manner in which the process of the invention is conducted. It should be understood however, that these examples are merely illustrative and are not to be regarded as limitations to the appended claims, since the basic teachings therein may be varied at will, as will be understood by those skilled in the art. In the examples, the proportions are expressed in parts by weight unless otherwise noted.

Example I

A solution of 36 parts of glycidaldehyde in 450 parts of diethyl ether was reacted with 41 parts of hydroxylamine sulfate and 43 parts of sodium bicarbonate. After adding 10 parts of water to initiate the reaction, the mixture was stirred vigorously at 10–15° C. Carbon dioxide evolution was rapid at first, but after one hour the rate of gas produced was slow and the ether solution was decanted from the insoluble precipitate and dried over anhydrous magnesium sulfate.

The ether was then stripped from the resulting glycidaldehyde oxime under reduced pressure while holding the temperature of the liquid below 10° C., leaving 29 parts of the oxime remaining. The oxime was reacted with 1.3 molar equivalents of acetic anhydride and allowed to warm to 35° C., being held at that temperature with a water bath until no more heat was evolved. After several hours at room temperature, acetic acid and excess acetic anhydride were removed from the mixture by vacuum flashing at temperatures below 40° C. The residual glycidaldehyde oxime acetate was then Claisen-distilled to give 28 parts of a product having a boiling point of 60–65° C./1 mm. and a refractive index $n_D^{20}$ 1.4647. The analysis of the distillate was in agreement of the theoretical composition of glycidaldehyde oxime acetate.

|  | Percent | | | Ester Value, eq./100 g. | Epoxide Value, eq./100 g. |
|---|---|---|---|---|---|
|  | C | H | N |  |  |
| Theoretical for $C_5H_7NO_3$ | 46.5 | 5.5 | 10.8 | 0.77 | 0.77 |
| Found | 46.5 | 5.5 | 10.8 | 0.76 | 0.70 |

A 32-part sample of the oxime acetate prepared in this manner was placed in a 100-ml. distillation kettle fitted with a 1 x 50 cm. glass spiral-packed column. The pressure in the system was reduced to 50 cm., and the kettle heated in an oil bath. The acetate began visibly to decompose at above 100° C. and a satisfactory rate of decomposition was obtained by heating the acetate at 140–145° C. with the head temperature at or below 70° C. At the end of 2½ hours almost 25 parts of total products had been taken off in this manner, and somewhat more was obtained by continuing heating at a pressure of 1 mm. Distillation residue was 5.0 grams.

The distillate mixture of acetic acid and nitrile so recovered was carefully redistilled through the column and yielded 7.3 parts of glycidonitrile, having a boiling point of 48° C./20 mm. and a refractive index $n_D^{20}$ 1.4094. Analysis of the nitrile gave data substantially agreeing with the theoretical values for glycidonitrile.

|  | Percent | | | Epoxide Value, eq./100 g. | Carbonyl Value, eq./100 g. |
|---|---|---|---|---|---|
|  | C | H | N |  |  |
| Theoretical for $C_3H_3NO$ | 52.2 | 4.4 | 20.3 | 1.45 | 0 |
| Found | 52.2 | 4.5 | 20.0 | 1.35 | 0.01 |

In another run conducted in the manner described, the epoxy nitrile was isolated by dissolving the mixture of acetic acid and nitrile in an excess of ether, and washing out the acetic acid with concentrated aqueous sodium bicarbonate. In this way a sample of glycidonitrile of reasonable purity was obtained.

The glycidonitrile produced in these experiments was a clear colorless liquid with a penetrating odor. It is somewhat soluble in water but twice as soluble in ether and completely soluble in other common organic solvents such as benzene, toluene, pentane, hexane and dioxane.

A small sample of glycidonitrile heated on a steam bath at atmospheric pressure for one-half hour showed no evidence of decomposition or polymerization. At the end of that time, the refractive index of the sample had not changed.

Example II

Using the process described in the previous example, the following epoxyalkyl nitriles are prepared from the epoxy aldoximes listed.

| Epoxy Aldoxime | Acidic Reactant | Epoxy Nitrile |
|---|---|---|
| 3,4-epoxybutanaldoxime | acetic acid | 3,4-epoxybutanonitrile. |
| 2,3-epoxy-2-methyl-propanaldoxime. | propionic anhydride | 2,3-epoxy-2-methyl-propionitrile. |
| 5,6-epoxyhexanaldoxime | caproic acid | 5,6-epoxyhexanenitrile. |
| 2,3-epoxypentanaldoxime. | n-butyric anhydride | 2,3-epoxypentanenitrile. |

I claim as my invention:

1. A process for preparing glycidonitrile which comprises reacting glycidaldoxime with acetic anhydride to form the glycidaldoxime acetate, and pyrolyzing the acetate at a temperature from about 100° C. to about 200° C. to produce glycidonitrile.

2. The process for preparing glycidonitrile, which comprises reacting glycidaldoxime with a lower alkyl acidic reagent selected from the group consisting of carboxylic acids and anhydrides thereof to form the glycidaldoxime ester, and pyrolyzing said oxime ester at a temperature of from about 100° C. to about 200° C. to produce glycidonitrile.

3. The process for preparing a vic-epoxyalkyl nitrile, while comprises reacting an unsubstituted vic-epoxyalkyl aldoxime of up to 8 carbon atoms with a lower alkyl acidic reagent selected from the group consisting of carboxylic acids and anhydrides thereof to form the alkyl ester of the aldoxime, and pyrolyzing the oxime ester at a temperature from about 100° C. to about 200° C. to produce the vic-epoxyalkyl nitrile.

4. The process for preparing a vic-epoxyalkyl nitrile, which comprises reacting an unsubstituted alpha,beta-epoxyalkyl aldoxime of up to 8 carbon atoms with a lower alkanoic acid to form the alkyl ester of the aldoxime, and pyrolyzing the ester at a temperature of from about 100° C. to about 200° C. to produce the alpha, beta-epoxyalkyl nitrile.

5. The process of preparing an alpha,beta-epoxyalkyl nitrile which comprises reacting an unsubstituted alpha,beta-epoxyalkyl aldoxime of up to 8 carbon atoms with the anhydride of a lower alkanoic acid to form the alkyl ester of the aldoxime, and pyrolyzing the ester at a temperature from about 100° C. to about 200° C. to produce the alpha,beta-epoxyalkyl nitrile.

6. The process for preparing an alpha,beta-epoxyalkyl nitrile, which comprises reacting an unsubstituted alpha,beta-epoxyalkyl aldoxime having up to 8 carbon atoms with acetic anhydride to form the alpha,beta-epoxy aldoxime acetate, and pyrolyzing the aldoxime acetate from about 100° C. to about 200° C. to produce the alpha,beta-epoxyalkyl nitrile.

References Cited in the file of this patent

UNITED STATES PATENTS

| | | |
|---|---|---|
| 2,785,185 | Phillips et al. | Mar. 12, 1957 |
| 2,900,392 | Remes et al. | Aug. 18, 1959 |

FOREIGN PATENTS

| | | |
|---|---|---|
| 735,990 | Great Britain | Aug. 31, 1955 |

OTHER REFERENCES

Bodforss: Die Aethylenoxyde; ihre Darstellung und Eigenschaften, page 12 (1920).

Beilstein, vol. 18, page 261–262 (1934).

Degering: An Outline of Organic Nitrogen Compounds, page 503 (1950).